United States Patent
Protter et al.

(10) Patent No.: US 9,681,118 B2
(45) Date of Patent: Jun. 13, 2017

(54) METHOD AND SYSTEM FOR RECALIBRATING SENSING DEVICES WITHOUT FAMILIAR TARGETS

(71) Applicant: Infinity Augmented Reality Israel Ltd., Petach-Tikva (IL)

(72) Inventors: Matan Protter, Kiryat Ono (IL); Motti Kushnir, Kiryat Ono (IL)

(73) Assignee: Infinity Augmented Reality Israel Ltd., Petach-Tikva (IL)

( * ) Notice: Subject to any disclaimer, the term of this patent is extended or adjusted under 35 U.S.C. 154(b) by 66 days.

(21) Appl. No.: 14/872,158

(22) Filed: Oct. 1, 2015

(65) Prior Publication Data
US 2017/0099477 A1  Apr. 6, 2017

(51) Int. Cl.
*H04N 13/02* (2006.01)
*G06F 17/30* (2006.01)

(52) U.S. Cl.
CPC ..... *H04N 13/0246* (2013.01); *G06F 17/3028* (2013.01); *H04N 13/0253* (2013.01)

(58) Field of Classification Search
CPC  A61B 6/022; G06T 7/85; G06T 7/521; G06T 7/529; G06T 7/55; G06T 7/593; G06T 2200/08; G01B 11/25; H04N 2013/0096; H04N 2213/003; H04N 2213/008; H04N 19/597; H04N 13/004; H04N 13/0007; H04N 13/0022
USPC ................................ 382/154; 345/178, 419
See application file for complete search history.

(56) References Cited

U.S. PATENT DOCUMENTS

| | | | | |
|---|---|---|---|---|
| 8,274,406 B2* | 9/2012 | Karlsson | ............... | G01C 21/12 318/568.11 |
| 2006/0188131 A1* | 8/2006 | Zhang | .................... | G06T 7/246 382/103 |
| 2010/0238351 A1* | 9/2010 | Shamur | ............... | G11B 27/036 348/598 |
| 2012/0206596 A1* | 8/2012 | Samarasekera | ...... | G01C 21/005 348/135 |
| 2014/0313347 A1 | 10/2014 | Wu et al. | | |

OTHER PUBLICATIONS

Davison, Andrew J., et al. "MonoSLAM: Real-time single camera SLAM." IEEE transactions on pattern analysis and machine intelligence 29.6 (2007).*

* cited by examiner

*Primary Examiner* — Bhavesh Mehta
*Assistant Examiner* — Narek Zohrabyan
(74) *Attorney, Agent, or Firm* — Pearl Cohen Zedek Latzer Baratz LLP

(57) ABSTRACT

Methods and systems for recalibrating sensing devices without using familiar targets are provided herein. The method may include: capturing a scene using a sensing device; determining whether or not the device is calibrated; in a case that said sensing device is calibrated, adding at least one new landmark to the known landmarks; in a case that said sensing device is not calibrated, determining at least some of the captured objects as objects stored on a database as known landmarks at the scene whose position is known; and calibrating the sensing device based on the known landmarks. The system may have various architectures that include a sensing device which captures images of the scene and further derive 3D data on the scene of some form.

33 Claims, 4 Drawing Sheets

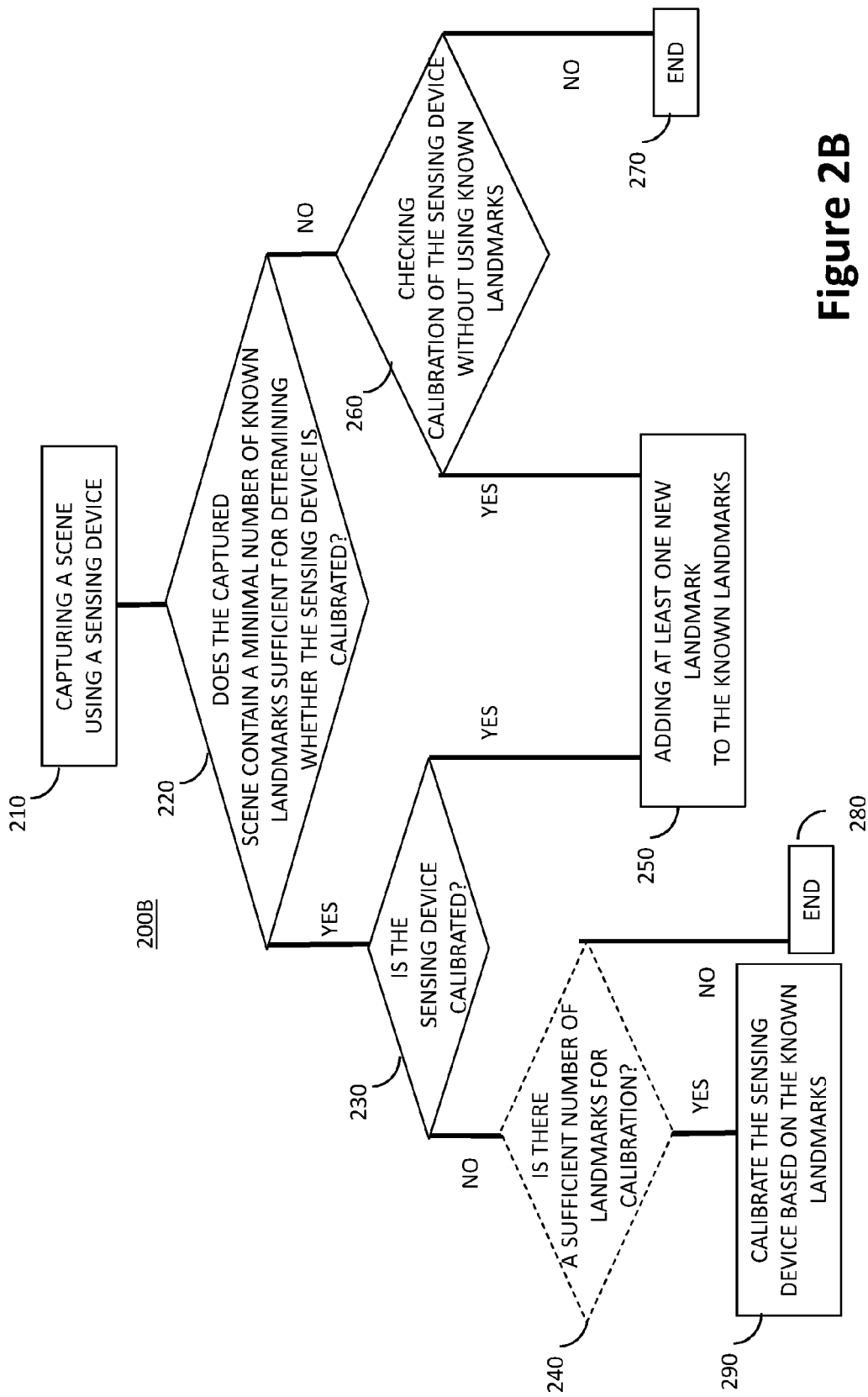

METHOD AND SYSTEM FOR RECALIBRATING SENSING DEVICES WITHOUT FAMILIAR TARGETS

FIELD OF THE INVENTION

The present invention relates generally to the field of calibrating sensing devices, and more particularly to such calibration carried out without the need for predefined calibration targets.

BACKGROUND OF THE INVENTION

Prior to setting forth the background of the invention, it may be helpful to set forth definitions of certain terms that will be used hereinafter.

The term 'camera' or 'sensing device" as used herein is broadly defined as any combination of one or more sensors that are configured to capture three-dimensional data of a scene, directly or through further manipulation. An exemplary sensing device may include a pair of cameras which are configured to capture passive stereo which may derive depth data by comparing the images taken from different locations. Another example for a sensing device may include a structured light sensor which is configured to receive and analyze reflections of a predefined light pattern that has been projected onto the scene. A structured light system includes a radiation source (such as a laser source) and a sensor configured to capture the reflections from the radiation source Yet another example would be a single camera for capturing 2D images together with a measurement device that can measure the distance the sensing device travels. Such a measurement device can be, but not limited to, an inertial measurement unit (IMU) or odometer.

The term 'three dimensional rig' or '3D Rig' as used herein is defined as any device for mounting at least two cameras or at least one camera and a radiation source that together form a 3D-system capable of capturing images and videos of a scene. A 3D Rig must provide the possibility to mount two cameras or one camera and one radiation source, with a horizontal or vertical offset and adjust the cameras in all possible axes.

The term 'calibration' and more specifically "camera calibration" as used herein is defined as the process of adjusting predefined parameters so that the camera, or the sensing device may operate optimally. Calibration of a 3D Rig involves the calibration of a plurality of cameras. The calibration of a 3D Rig includes the alignment or configuration of several cameras and in particular the process of identifying the deviation of several parameters relating cameras' spatial alignment from a predefined value tolerance and remedying the identified deviation. It is said that a certain sensing device is calibrated whenever the estimated calibration parameters, reflect the actual calibration parameters, taken at the specified timeslot, within an agreeable margin. It is possible to verify that a device is calibrated by comparing distances measured by the device with distances obtained from un-related sources (e.g., directly measured).

The term "landmark" as used herein relates to visual features used by a variety of computer vision applications such as image registration, camera calibration, and object recognition. Using landmarks is advantageous as it offers robustness with regard to lightning conditions as well as the ability to cope with large displacements in registration. As defined herein, a landmark comprises both artificial and natural landmarks. Exemplary landmarks may include corners or repetitive patterns in images.

One of the challenges of sensing devices that are required to capture a scene in real time, such as wearable near-eye displays, is to maintain calibration in real-time. More specifically, as such devices tend to lose its initial calibration quite easily (e.g., due to physical impact applied to the sensing device), it is essential to be able to regain calibration quickly without requiring manual intervention.

While calibrating a sensing device using pre-registered landmarks is well known in the art, when operating in an unfamiliar scene in which pre-registered landmarks cannot be identified, calibration becomes a more difficult task.

It would be, therefore, advantageous to provide a method and a system that addresses the calibration challenge in unfamiliar scenes.

SUMMARY OF THE INVENTION

Some embodiments of the present invention provide a method and a system that enable recalibrating of sensing devices without familiar targets, so that newly generated landmarks may be useful in a future calibration process of the sensing device.

According to some embodiments, the method may include: capturing a scene using a sensing device; determining whether or not the device is calibrated; in a case that said sensing device is calibrated, adding at least one new landmark to the known landmarks; in a case that said sensing device is not calibrated, calibrating the sensing device based on the known landmarks. The system may have various architectures that include a sensing device which captures images of the scene and further derive 3D data on the scene of some form.

According to another non-limiting embodiment, the method may include: capturing a scene using a sensing device; determining whether the captured scene contains a minimal number of known landmarks sufficient for determining whether the sensing device is calibrated; in a case that the captured scene contains said minimal number of landmarks, checking whether said sensing device is calibrated; in a case that said sensing device is calibrated, adding at least one new landmark to the known landmarks; in a case that said sensing device is not calibrated, calibrating the sensing device based on the known landmarks; and in a case that the captured scene does not contain said minimal number of landmarks, checking calibration of the sensing device without using known landmarks, and in a case that the sensing device is calibrated, adding at least one new landmark to the known landmarks.

It should be noted that determining whether a sensing device or a 3D rig is fully calibrated requires fewer landmarks than the actual calibration process. Therefore, in case that a calibrated condition is identified, it would be easier to generate more landmarks of the unfamiliar scene.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 2B is a high level flowchart illustrating another non-limiting exemplary method in accordance with some embodiments of the present invention.

Figure 1:
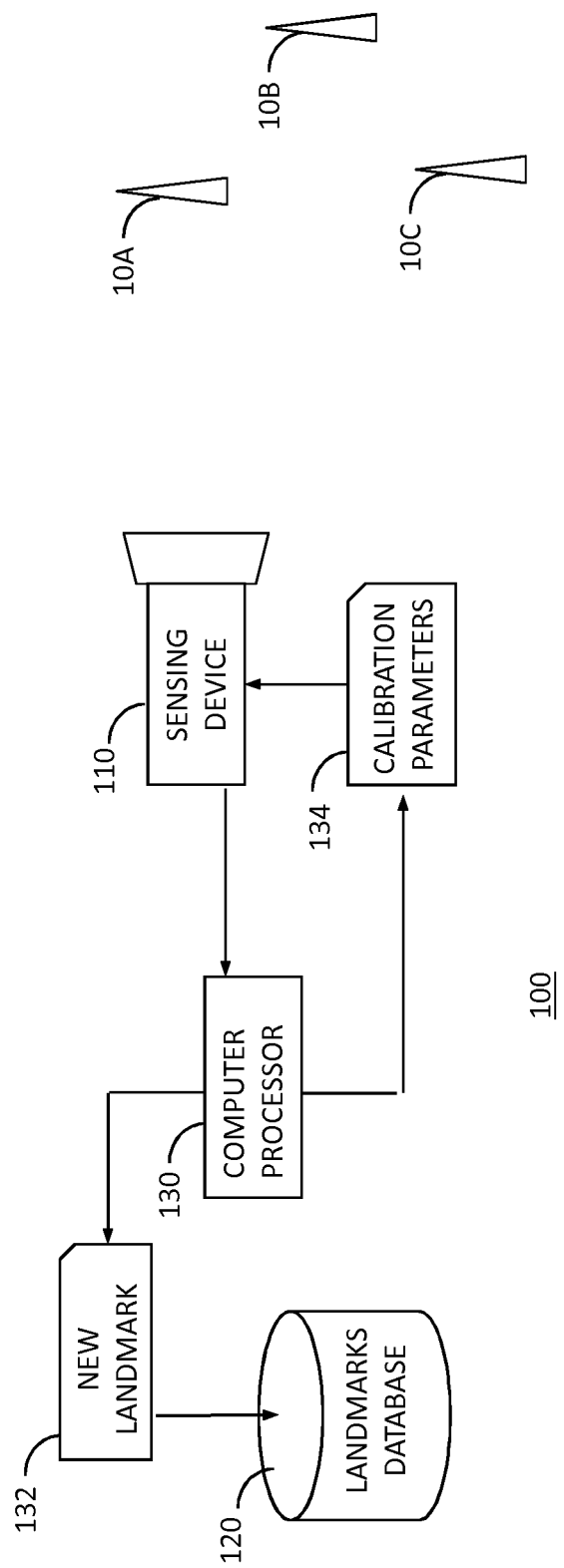
FIG. 1 is a block diagram illustrating non-limiting exemplary architectures of a system in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

FIG. 1 is a block diagram illustrating an exemplary architecture on which embodiments of the present invention may be implemented. System 100 may include a sensing device 110 configured to capture a scene. System 100 may further include a landmarks database 120 configured to store landmarks known in the scene (e.g., 10A, 10B, and 10C).

In some embodiments, system 100 may further include a computer processor 130 configured to determine whether or not the device is calibrated, based on the captured image, wherein in a case that said sensing device is calibrated, the computer processor configured to add at least one new landmark to the known landmarks, and wherein in a case that said sensing device is not calibrated, the computer processor is configured to calibrate the sensing device based on the known landmarks.

In other embodiments, system 100 may further include a computer processor 130 configured to determine whether the captured scene contains a minimal number of known landmarks sufficient for determining whether the sensing device is calibrated. In some embodiments, computer processor 130 is further configured to carry out the calibration process, whereas in other embodiments, a different computer processor is being used for the actual calibration process.

It should be noted that the number of landmarks sufficient for determining whether the sensing device is calibrated is usually lower than the number of landmarks sufficient for actually calibrating the sensing device. This important property is used herein as the ability to determine whether the sensing device is calibrated.

In a case that the captured scene contains said minimal number of landmarks, the computer processor is configured to check whether sensing device 110 is calibrated, wherein in a case that sensing device 110 is calibrated, computer processor 130 is configured to add at least one new landmark 132 to landmarks database 120, wherein in a case that sensing device 110 is not calibrated, computer processor 130 is configured to calibrate sensing device 110 based on the known landmarks, and wherein in a case that the captured scene does not contain the minimal number of landmarks, computer processor 130 is configured to check calibration of sensing device 110 without using known landmarks (e.g., 10A, 10B, and 10C), and in a case that sensing device 110 is calibrated, computer processor 130 is configured to add at least one new landmark 132 to the landmarks database 120.

Figure 2A:
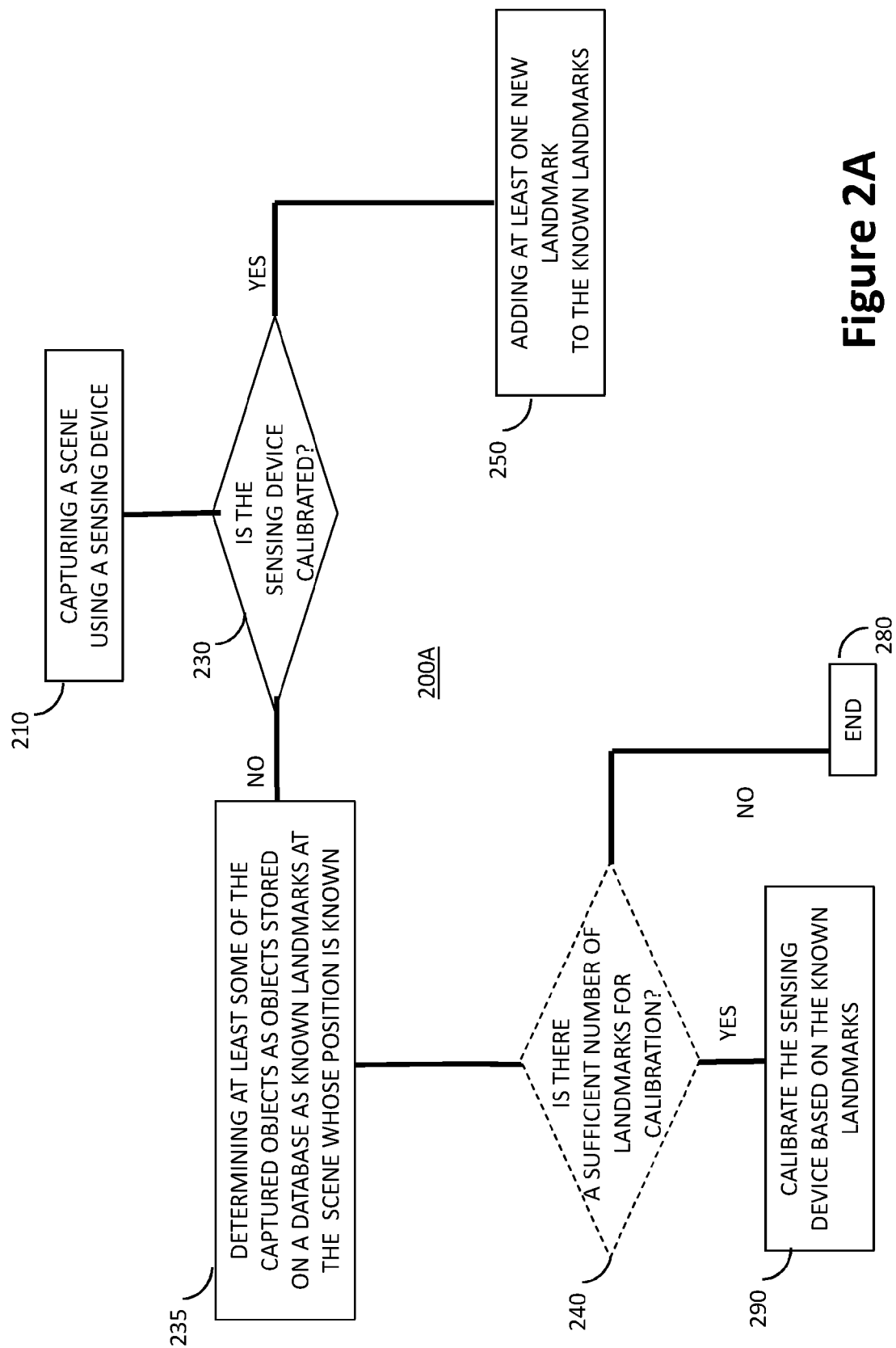
FIG. 2A is a high level flowchart illustrating non-limiting exemplary method in accordance with some embodiments of the present invention.

FIG. 2A is a high level flowchart illustrating a method 200A for recalibrating sensing devices without familiar targets. The method may include: capturing a scene using a sensing device 210; determining whether the sensing device is calibrated 230; in a case that the sensing device is calibrated, adding at least one new landmark to the known landmarks 250. In a case that said sensing device is not calibrated, determining at least some of the captured objects as objects stored on a database as known landmarks at the scene whose relative position is known 235 and calibrating the sensing device based on the known landmarks 290. In some embodiments, in a case that the sensing device is determined as non-calibrated it is first checked whether there is a sufficient number of landmarks for calibrating the sensing device 240 and only in a case that the captured scene contains the minimal number of landmarks, calibrating the sensing device based on the known landmarks, Otherwise, the process ends 280.

FIG. 2B is a high level flowchart illustrating a method 200B for recalibrating sensing devices without familiar targets. The method may include: capturing a scene using a sensing device 210; determining whether the captured scene contains a minimal number of known landmarks sufficient for determining whether the sensing device is calibrated 220; in a case that the captured scene contains the minimal number of landmarks, checking whether said sensing device is calibrated 230, in a case that said sensing device is calibrated, adding at least one new landmark to the known landmarks 250; in a case that said sensing device is not calibrated, calibrate the sensing device based on the known landmarks 290; and in a case that the captured scene does not contain said minimal number of landmarks, checking calibration of the sensing device without using known landmarks 260, and in a case that the sensing device is calibrated, adding at least one landmark to the known landmarks 250, Otherwise, the process ends 270. In some embodiments, in a case that the sensing device is determined as non-calibrated, it is first checked whether there is a sufficient number of landmarks for calibrating the sensing device 240 and only in a case that the captured scene contains the minimal number of landmarks, calibrating the sensing device based on the known landmarks, Otherwise, the process ends 280.

In accordance with some embodiments of the present invention, two modes (usually both are applied) are operable for identifying whether the sensing device is calibrated. In the first one, without the "learned" targets matching features are determined between the components of the sensing device and check if they meet the geometric requirements (such as epipolar lines). One limitation that is present there is that we cannot recognize errors that are parallel to the epipolar lines (e.g., in the case of two cameras).

In the second mode, with learned targets, it is determined which of the learned targets are visible, possibly using standard target recognition. For each of the learned targets: detect the features from the database in the current frame from the 3D rig, with high-accuracy, while not all features need to be found. Then, it is checked how accurately the known features comply with the sensing device's geometric model and its current parameters. If the accuracy is worse than some threshold, then the sensing device is deemed not calibrated.

According to some embodiments of the present invention, the check of calibration is performed using the known landmarks.

According to some embodiments of the present invention, the at least one new landmark is selected based on pre-defined criteria including at least one of: textured area, uniqueness of appearance; low-complexity structure; size and distribution of the points; and distance from the sensing device.

According to some embodiments of the present invention, the method may further include a step of maintaining a landmarks database configured to store known and newly added landmarks, wherein the database is searchable. The database may be configured to further store low resolution versions or other descriptors of the landmarks, for quick retrieval.

According to some embodiments of the present invention, searching the database for a known landmark takes into account various points of views.

According to some embodiments of the present invention, the new landmarks are stored together with metadata (e.g., descriptors or hash functions) for facilitating contextual search of said landmarks.

According to some embodiments of the present invention, the further identified landmarks are stored in a way to allow fast searching through the database, wherein landmarks from the same environment are clustered.

Figure 3:
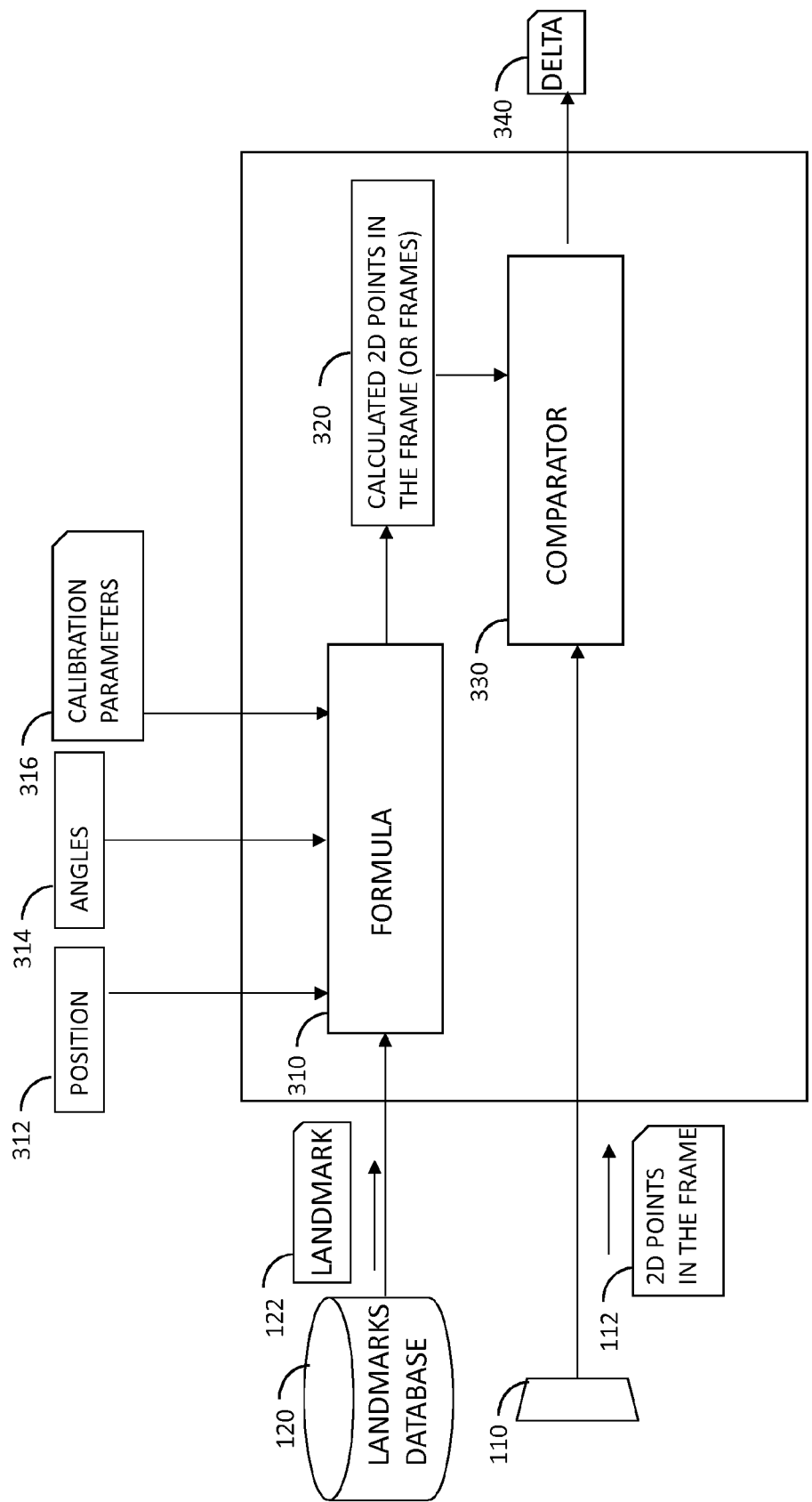
FIG. 3 is a block diagram illustrating yet another aspect in accordance with some embodiments of the present invention.

FIG. 3 is a block diagram illustrating yet another aspect in accordance with some embodiments of the present invention. An exemplary implementation of the algorithm in accordance with some embodiments of the present invention is described herein. Capturing device 110 provides data relating to 2D points in the frame 112 while landmarks database provide data relating to the landmark 122 in the scene. The landmark data 122 are then being input to a formula 310 that is tailored for the specific 3D rig or sensing device. The formula then maps the landmark data 122 to a calculated 2D point or area on the frame 320 which is then compared by a comparator 330 with the data relating to 2D points in the captured frame 112 to yield a delta 340 being the difference between the calculated 2D point on the frame and the data on the 2D point in the frame. Then, in order to minimize delta 340, position 312, angles 314 and calibration parameters 316 are being adjusted in various manners known in the art so as the delta 340 is minimal. Once delta 340 is minimized, the 3D rig or sensing device is calibrated and the adjusted calibration parameters are derived and stored.

According to some embodiments of the present invention, the calibration is solved by minimizing an objective function measuring the projection errors. Alternatively, it can be solved by minimizing by using gradient descent. Further alternatively, the minimizing is carried out by using the Levenberg-Marquardt optimization technique.

Advantageously, some embodiments of the present invention are not limited to a 3D rig or a sensing device that captures 3D images. It may also be used to calibrate a system that includes a 2D sensing device coupled to an inertial measurement unit (IMU). In such a system, the geometric constraints are given between different frames of the same camera, with the geometery being measured from the IMU. Alternatively, the sensing device is a 2D camera mounted on a moving platform such as a robot, from which the motion can be measured from wheel angles and wheel rotations. It should be understood that the aforementioned embodiments should not be regarded as limiting and further applications may be envisoned in order to address further use cases.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method comprising:
   capturing a scene using a sensing device comprising one or more sensors;
   determining whether or not the device is calibrated;
   in a case that said sensing device is calibrated, adding at least one new landmark to the known landmarks;
   in a case that said sensing device is not calibrated, determining at least some objects in the captured scene as objects stored on a database as known landmarks at the scene whose position is known; and
   calibrating the sensing device based on the known landmarks.

2. The method according to claim 1, wherein in a case that said sensing device is not calibrated, checking whether the captured scene contains a minimal number of known landmarks sufficient for performing calibration; and in a case that said scene contains at least the minimal number of known landmarks, calibrating the sensing device based on the known landmarks.

3. The method of claim 1, wherein the check of calibration is performed using the known landmarks.

4. The method according to claim 1, wherein the at least one new landmark is selected based on predefined criteria including at least one of: textured area; uniqueness of appearance; low-complexity structure; size and distribution of points in the captured scene; and distance from the sensing device.

5. The method according to claim 1, further comprising maintaining a landmarks database configured to store known and newly added landmarks, wherein the database is searchable.

6. The method according to claim 5, wherein the database is configured to further store low resolution versions of the landmarks.

7. The method according to claim 5, wherein searching the database for a known landmark takes into account various points of views.

8. The method according to claim 5, wherein the new landmarks are stored together with metadata used to perform a contextual search of said landmarks.

9. The method according to claim 5, wherein the at least one landmark is stored in a way such that landmarks from the same environment are clustered.

10. The method according to claim 1, wherein the calibration is solved by minimizing an objective function measuring the projection errors.

11. The method according to claim 10, wherein the minimizing is using gradient descent.

12. The method according to claim 10, wherein the minimizing is using the Levenberg-Marquardt optimization technique.

13. A method comprising:
    capturing a scene using a sensing device comprising one or more sensors;
    determining whether the captured scene contains a minimal number of known landmarks sufficient for determining whether the sensing device is calibrated;
    in a case that the captured scene contains said minimal number of landmarks, checking whether said sensing device is calibrated,
    in a case that said sensing device is calibrated, adding at least one new landmark to the known landmarks;
    in a case that said sensing device is not calibrated, calibrating the sensing device based on the known landmarks; and
    in a case that the captured scene does not contain said minimal number of landmarks, checking calibration of the sensing device without using known landmarks, and in a case that the sensing device is calibrated, adding at least one new landmark to the known landmarks.

14. The method according to claim 13, wherein in a case that said sensing device is not calibrated, checking whether the captured scene contains a minimal number of known landmarks sufficient for performing calibration; and in a case that said scene contains at least the minimal number of known landmarks, calibrating the sensing device based on the known landmarks.

15. The method of claim 13, wherein the check of calibration is performed using the known landmarks.

16. The method according to claim 13, wherein the at least one new landmark is selected based on predefined criteria including at least one of: textured area; uniqueness of appearance; low-complexity structure; size and distribution of points in the captured scene; and distance from the sensing device.

17. The method according to claim 13, further comprising maintaining a landmarks database configured to store known and newly added landmarks, wherein the database is searchable.

18. The method according to claim 17, wherein the database is configured to further store low resolution versions of the landmarks.

19. The method according to claim 17, wherein searching the database for a known landmark takes into account various points of views.

20. The method according to claim 17, wherein the new landmarks are stored together with metadata used to perform a contextual search of said landmarks.

21. The method according to claim 17, wherein the at least one new landmark is stored in a way such that landmarks from the same environment are clustered.

22. The method according to claim 13, wherein the calibration is solved by minimizing an objective function measuring the projection errors.

23. The method according to claim 22, wherein the minimizing is using gradient descent.

24. The method according to claim 22, wherein the minimizing is using the Levenberg-Marquardt optimization technique.

25. A system comprising:
    a sensing device comprising one or more sensors configured to capture an image scene;
    a database configured to store landmarks; and a computer processor configured to determine whether the device is calibrated or not, based on the captured image, wherein in a case that said sensing device is calibrated, the computer processor is configured to add at least one new landmark to the known landmarks, and wherein in a case that said sensing device is not calibrated, the computer processor is configured to calibrate the sensing device based on the known landmarks.

26. The system according to claim 25, wherein in a case that said sensing device is not calibrated, the computer processor is configured to check whether the captured image contains a minimal number of known landmarks sufficient for performing calibration; and in a case that said scene contains at least the minimal number of known landmarks, the computer processor is configured to calibrate the sensing device based on the known landmarks.

27. The system according to claim 25, wherein the at least one new landmark is selected based on predefined criteria including at least one of: textured area; uniqueness of appearance; low-complexity structure; size and distribution of points in the captured scene; and distance from the sensing device.

28. The system according to claim 25, further comprising maintaining a landmarks database configured to store known and newly added landmarks, wherein the database is searchable.

29. The system according to claim 28, wherein the database is configured to further store low resolution versions of the landmarks.

30. The system according to claim 28, wherein searching the database for a known landmark takes into account various points of views.

31. The system according to claim 28, wherein the new landmarks are stored together with metadata used to perform a contextual search of said landmarks.

32. The system according to claim 28, wherein the at least one new landmark is stored in a way such that landmarks from the same environment are clustered.

33. A system comprising:
a sensing device comprising one or more sensors configured to capture a scene;
a database configured to store landmarks; and
a computer processor configured to determine whether the captured scene contains a minimal number of known landmarks sufficient for determining whether the sensing device is calibrated, wherein in a case that the captured scene contains said minimal number of landmarks, the computer processor is configured to check whether said sensing device is calibrated, wherein in a case that said sensing device is calibrated, the computer processor is configured to add at least one new landmark to the landmarks database, wherein in a case that said sensing device is not calibrated, the computer processor is configured to calibrate the sensing device based on the known landmarks, and wherein in a case that the captured scene does not contain said minimal number of landmarks, the computer processor is configured to check calibration of the sensing device without using known landmarks, and in a case that the sensing device is calibrated, the computer processor is configured to add at least one new landmark to the landmarks database.

* * * * *